June 12, 1945.    O. BROOKS    2,378,179
LAWN MOWER SHARPENER
Filed May 31, 1944    2 Sheets-Sheet 1
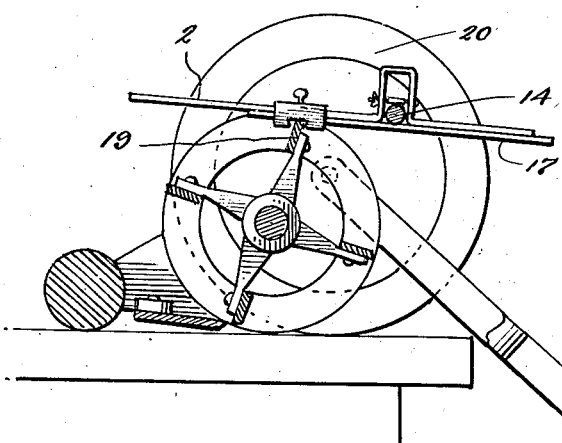
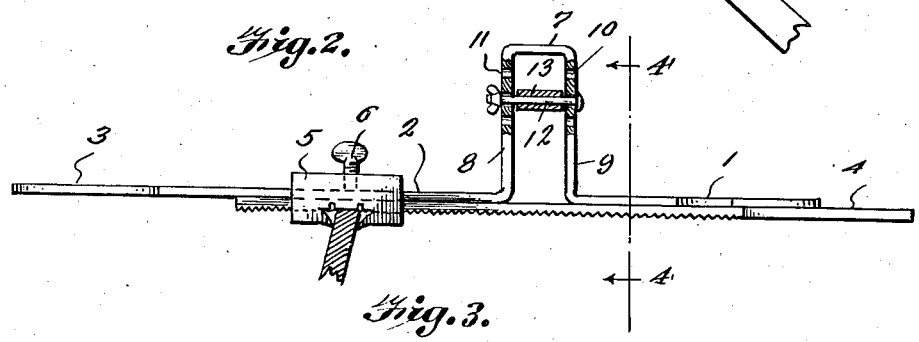
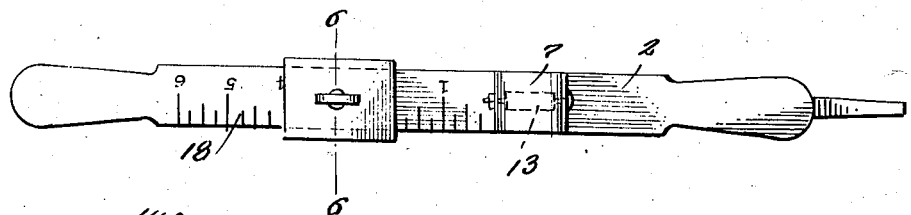
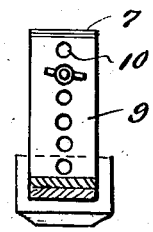
Inventor
OAKLEY BROOKS
By L. F. Randolph
Attorney June 12, 1945. O. BROOKS 2,378,179
LAWN MOWER SHARPENER
Filed May 31, 1944 2 Sheets-Sheet 2
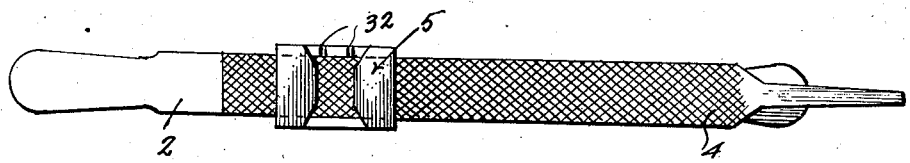
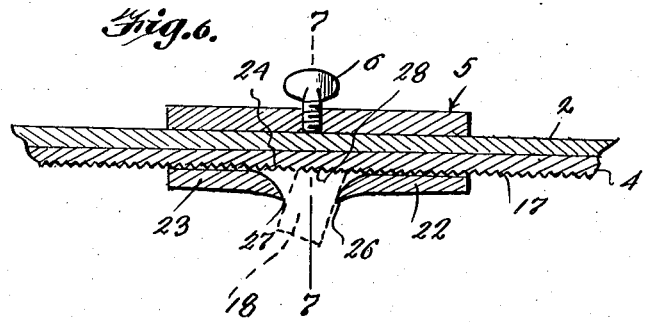
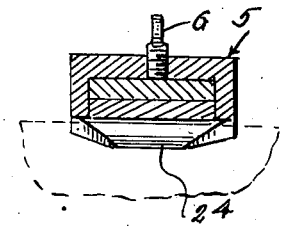
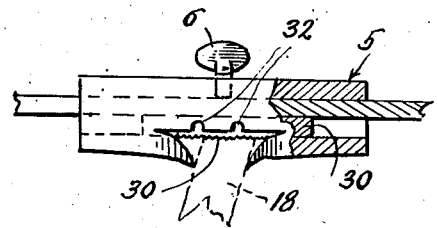
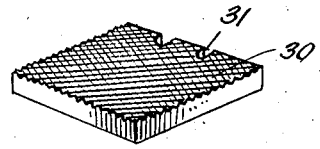
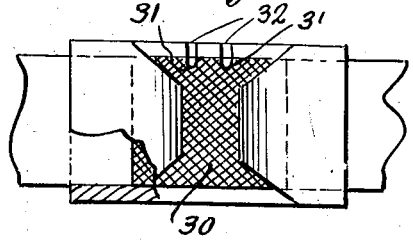
Inventor
OAKLEY BROOKS
By L. F. Randolph
Attorney Patented June 12, 1945

2,378,179

UNITED STATES PATENT OFFICE 2,378,179

LAWN MOWER SHARPENER

Oakley Brooks, Columbus, Ohio

Application May 31, 1944, Serial No. 538,117

1 Claim. (Cl. 76—82.1)

This invention relates to improvements in a lawn mower blade sharpening device, and has for its object to provide a very simple, inexpensive and effective tool whereby lawn mower blades may be rapidly sharpened.

Another object of the invention is to provide a two-end handle upon which a file carrier is adjustably mounted.

A further object of the invention is to provide a lawn mower blade sharpener device comprising a file holding means, a handle device upon which said file holder is adjustably mounted, a roller bearing for said handle member for operating upon a lawn mower frame rod.

With the above and such other objects in view, as may hereinafter more fully appear, I have invented the device shown in the accompanying drawings in which:

Figure 1 is a cross sectional view of a lawn mower illustrating my invention attached to one of its blades.

Figure 2 is an enlarged view of my device detached from the lawn mower.

Figure 3 is a top plan view of the invention.

Figure 4 is a section on line 4—4 of Figure 2.

Figure 5 is a bottom plan view of Figure 2.

Figure 6 is a section on line 6—6 of Figure 3.

Figure 7 is a section on line 7—7 of Figure 5.

Figure 8 is a side elevation of a file holder shown partly in section.

Figure 9 is a bottom plan view of Figure 8.

Figure 10 is a perspective view of a finishing file; and

Figure 11 is a perspective view of the file holder.

Like reference characters indicate like parts, throughout the following specification, and in the several views in the drawings in which 1 indicates my invention which comprises an elongated frame member 2 having handle ends 3 and 4. Slidably mounted on the member 2 is a file holder 5 and which is provided with a thumb screw 6 for securing the holder in fixed position. The member 2 is provided with a U-shaped upstanding projection 7 the side arms 8 and 9 of which are provided with a series of aligning bores 10 and 11 to receive a bolt 12 upon which is mounted a roller 13.

This roller bearing member is adjustable up or down according to the size of the blade to be sharpened, and the roller 13 bears upon a bar 14 which forms a part of the frame of the lawn mower proper.

The file holder or carrier 5 consists of a rectangular block 15 with a longitudinal passage 16 therethrough of a depth sufficient to take the frame member 2 and a file 17 which is slipped into position after the member 5 is placed upon said frame member. The elongated end 2' of the member 2 is provided with a scale 18 whereby the carrier may be properly placed relative to the blade 19 of the lawn mower 20 being sharpened and the rod 14.

The lower wall of the member 5 is supported centrally by a channel 21 forming two sections 22 and 23 the inner ends 24 and 25 of which are curved downwardly the terminals 26 and 27 of which engage the opposing sides of the blade 19, the cutting edge 28 of which projects upwardly against the cutting surface 29 of the file 17. This arrangement will permit the block 15 to slide freely backward and forward upon said blade.

After the blade has been roughly sharpened, the file 17 is removed and a finishing file block 30 is placed in the file carrier, the markers 31 thereon aligning with the markers 32 on the surface 33 of said file carrier. This latter file is operated upon the blade several times until a nice finishing edge has been obtained.

I claim:

A lawn mower blade sharpening device comprising a block having a passage way longitudinally therethrough and having a transverse opening across its bottom for receiving a blade to be sharpened, a frame member disposed through the block, a file disposed through the block and against the bottom side of the frame member, detent means on the block for holding the member and file intact and against relative movement with respect to each other, said frame member being formed with a vertical offset, said offset being provided with a roller mounted therein and between which and the adjacent portion of the file, a connecting rod of a lawn mower may be received.

OAKLEY BROOKS.